UNITED STATES PATENT OFFICE.

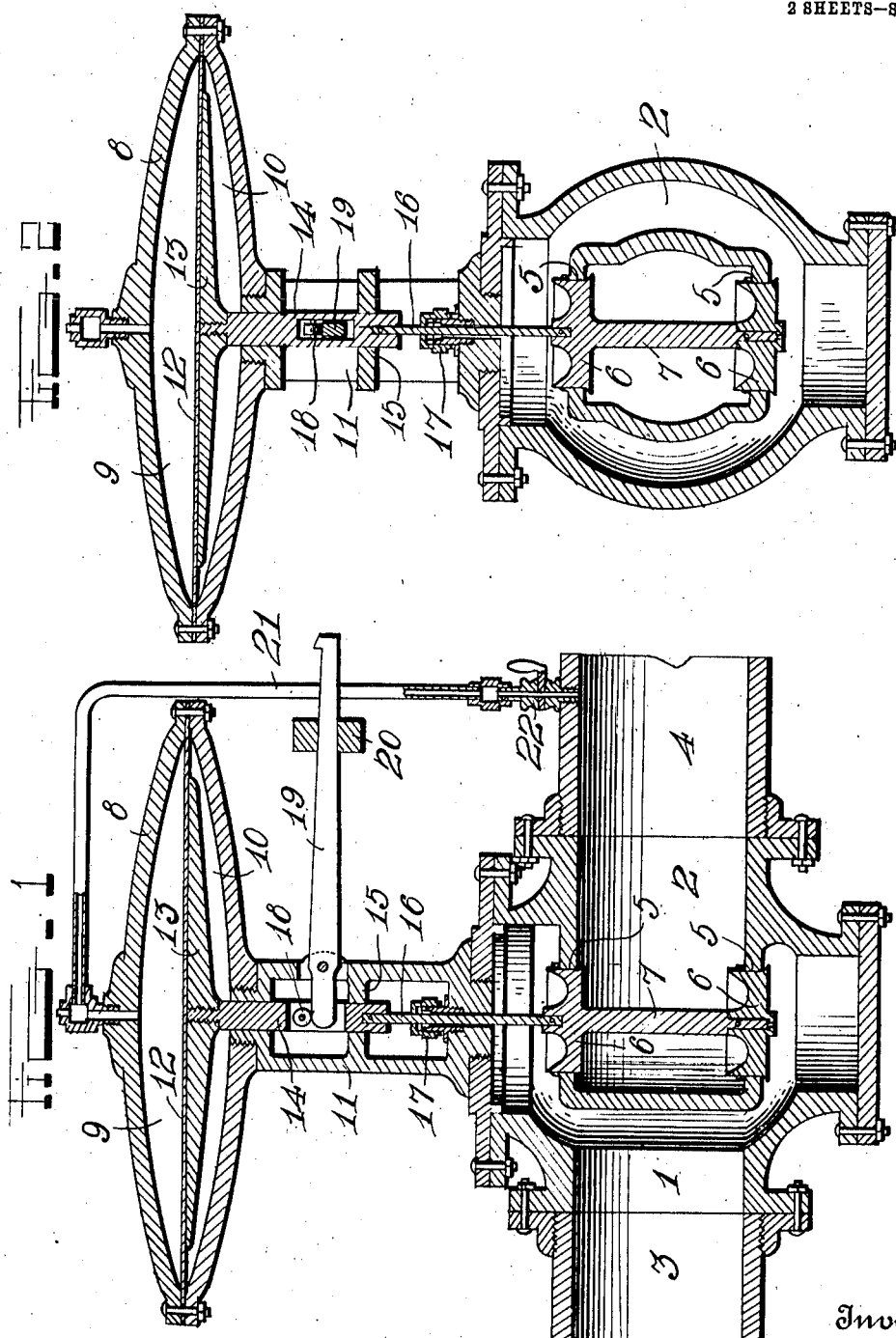

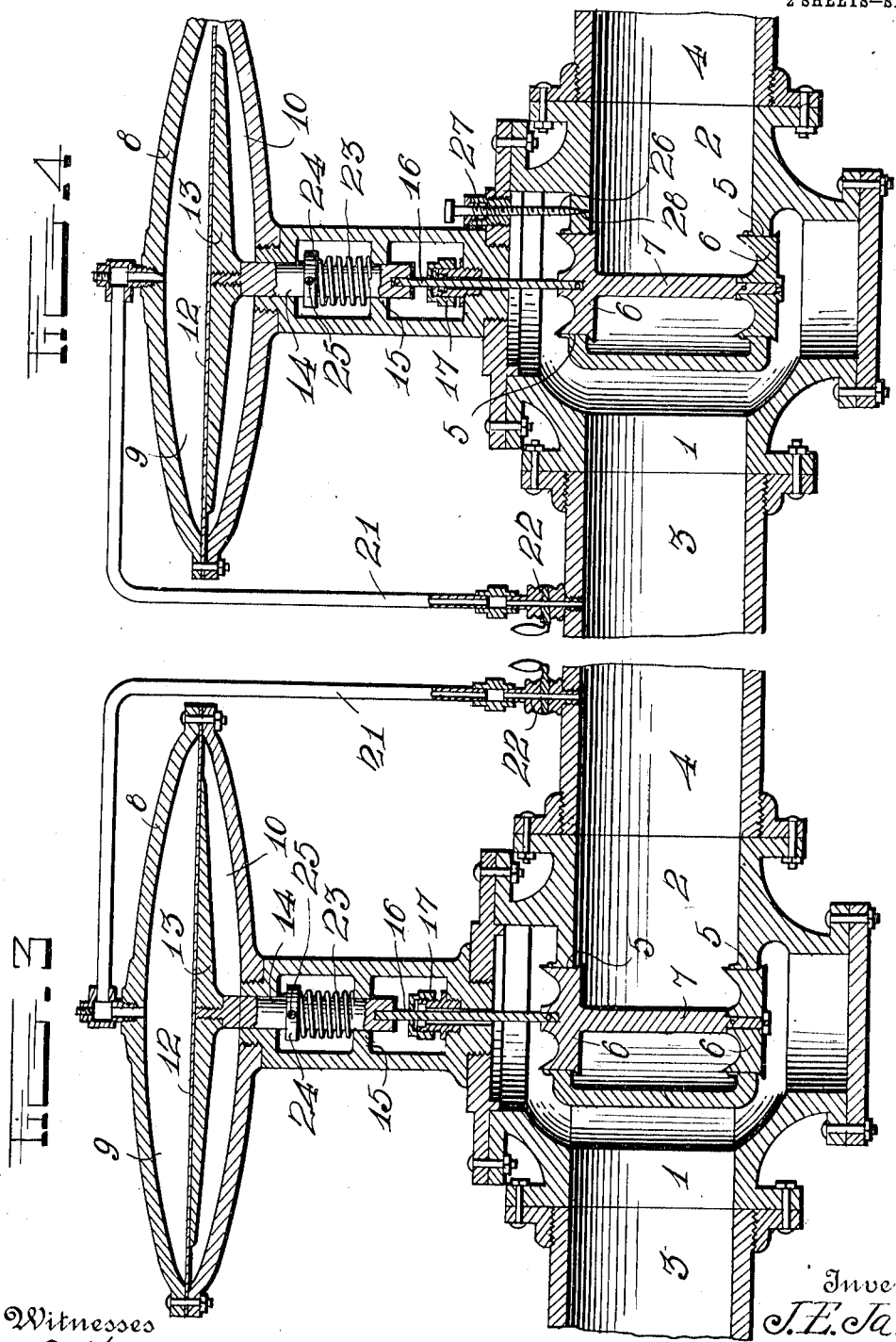

JOHN E. JAMES, OF WORTHINGTON, PENNSYLVANIA, ASSIGNOR OF ONE-HALF TO GODFREY L. CABOT, OF BOSTON, MASSACHUSETTS.

HIGH-PRESSURE REGULATOR AND CUT-OFF VALVE.

1,020,284.  Specification of Letters Patent.  Patented Mar. 12, 1912.

Application filed April 21, 1910. Serial No. 556,775.

*To all whom it may concern:*

Be it known that I, JOHN E. JAMES, a citizen of the United States, residing at Worthington, in the county of Armstrong and State of Pennsylvania, have invented certain new and useful Improvements in High-Pressure Regulators and Cut-Off Valves; and I do declare the following to be a full, clear, and exact description of the invention, such as will enable others skilled in the art to which it appertains to make and use the same.

This invention relates to improvements in high pressure regulators and cut off valves.

One object of the invention is to provide a high pressure regulator by means of which the fluid pressure is automatically controlled in pipe lines, wells, boilers, and the desired level maintained in reservoirs, tanks and the like.

Another object is to provide a regulator of this character which may be readily transformed into a cut off valve for use in connection with fluid conducting pipes whereby the flow of liquid therethrough will be automatically cut off should a break or leak occur in the pipes.

With these and other objects in view, the invention consists of certain novel features of construction, combination and arrangement of parts as will be more fully described and particularly pointed out in the appended claim.

In the accompanying drawings: Figure 1 is a central vertical longitudinal section of a regulator constructed in accordance with the invention; Fig. 2 is a similar view taken at right angles to Fig. 1; Fig. 3 is a vertical sectional view similar to Fig. 1 showing a slightly modified construction of the valve operating mechanism; and, Fig. 4 is a similar view showing the device arranged as an automatic cut off valve.

In the illustrated embodiment of the invention, I provide a valve casing comprising an outer shell 1 and an inner shell 2. With the outer shell 1 of the casing is connected an outlet pipe 3 while with the inner shell 2 at the opposite end of the casing is connected an inlet pipe 4. In the inner shell 2 are formed alined valve seats 5 with which are engaged valve 6, said valves being connected together by a stem 7 whereby they are moved in unison.

Arranged above the valve casing and connected thereto in any suitable manner is a diaphragm casing 8 which may be of the usual or any suitable construction and is shown as being formed in upper and lower sections 9 and 10. The sections 9 and 10 are bolted or otherwise secured together along their edges and the lower section 10 has depending therefrom a neck 11 by means of which the diaphragm casing 8 is connected with the valve casing. In the diaphragm casing is arranged a flexible diaphragm 12 the edges of which are secured between the bolted edges of the upper and lower sections 9 and 10 of said casing. The central portion of the diaphragm 12 is connected to a plate 13 having a downwardly extending operating rod 14 which projects into the neck 11 and is slidably engaged with guides 15 arranged therein. The lower end of the rod 14 is connected to the upper end of a stem 16 the lower end of which is connected to the upper valve 6 as shown. The stem 16 works through a stuffing box 17 arranged in the lower end of the neck 11 thus preventing the entrance of fluids from the valve casing to the neck. The rod 14 is slotted for a portion of its length and in said slotted portion is revolubly mounted an anti-friction roller 18 with which is engaged the inner end of a valve closing lever 19 which projects through and is pivotally mounted in one side of the neck 11 and has its inner end projecting into the slot in the rod 14 and into engagement with the roller 18. The inner end of the lever 19 is preferably rounded or curved to facilitate the engagement thereof with the roller. On the lever 19 is arranged a weight 20 which is adapted to be adjusted to control the opening and closing of the valve.

The upper portion of the diaphragm casing is connected by a fluid conducting pipe 21 with the inlet or high pressure pipe or end of the valve casing whereby when the pressure in this pipe or in the main connected thereto increases above a predetermined point said pressure will be applied to the diaphragm 12 thus depressing the latter and causing the same to open the valves 6 thus allowing the surplus fluid from the main or high pressure pipe to pass through the valve casing and into the outlet pipe. After the pressure has been thus reduced in the main the valve will be again automatically closed by the weighted lever 20. In the pipe 21 is preferably arranged a stop cock 22 whereby the diaphragm valve operating mechanism is cut out.

In Fig. 3 of the drawings the diaphragm rod 14 is shown as being provided with a coiled spring 23 which is adapted to take the place of the weighted lever 19 for closing the valves 6. The tension of the spring 23 is regulated to close the valve at any desired pressure by means of a collar 24 which is adjustably secured to the rod 14 by a set screw 25. The spring 23 is arranged on the rod 14 between the collar 24 and the guide 15 in the neck 11 so that when said collar is raised or lowered the spring will expand or be contracted thus regulating the tension or pressure of the same.

When the regulator is arranged as hereinbefore shown and described it will be readily seen that when the pressure in the main or at the inlet side of the valve has increased to such an extent that the pressure thereof on the upper side of the diaphragm is sufficient to overcome the pressure of the weighted lever 19 or of the spring 23 that said diaphragm will open the valves and permit the surplus fluid to pass through the valve casing thus decreasing the pressure. By this arrangement any surplus fluid in the mains which may accumulate after a certain pressure has been reached may be taken from the main and transferred to any other place. By this arrangement it will also be seen that the device may be employed as a safety valve for steam boilers for relieving the same of any dangerous pressure from the over-accumulation of steam and that the device may also be employed to control the level of water in tanks or reservoirs.

In Fig. 4 of the drawings is shown a slightly modified arrangement of the device wherein the same may be employed as a cut off valve for gas or other fluid conducting pipes. In order to transform the regulator to a cut off valve it is simply necessary to transfer the connecting pipe 21 which connects with the upper portion of the diaphragm from the inlet or high pressure side of the valve to the outlet or low pressure side as shown. By thus arranging the connecting pipe 21 and regulating the valve closing spring the valve will be held open against the tension of the spring by the pressure of the fluid from the outlet pipe of the valve casing through the action of the diaphragm. When thus arranged should a break or leak occur in the outlet pipe so that the pressure therein and in the upper portion of the diaphragm casing is reduced below the pressure of the spring the latter will immediately close the valve 6 and prevent any further flow of fluid through the valve casing. In thus adjusting the spring for closing the valve the pressure of the same should be slightly less than the lowest pressure maintained in the pipe line. In order to cause the valve to automatically open again after the break or leak has been repaired in the pipe I preferably provide a by-pass to permit the fluid to slowly accumulate in the outlet side of the casing and the pipe connected thereto until the pressure thereof in the upper portion of the diaphragm is sufficient to open the valve against the tension of the spring. The by-pass is here shown and is preferably in the form of a needle valve 26 which has a screw threaded engagement in the outer shell of the casing and passes through a stuffing box 27 arranged therein. The pointed inner end of the valve is adapted to be engaged with a valve seat 28 formed in the inner shell of the valve casing adjacent to the valve 6 as shown.

From the foregoing description taken in connection with the accompanying drawings, the construction and operation of the invention will be readily understood without requiring a more extended explanation.

Various changes in the form proportion and the minor details of construction may be resorted to without departing from the principle or sacrificing any of the advantages of this invention as defined in the appended claim.

Having thus described my invention what I claim is:

The combination of a main, a valve casing therein provided with a horizontal valve seat, a diaphragm casing above the valve casing, a diaphragm in the casing, a hollow neck connecting the top of the valve casing and the bottom of the diaphragm casing, and having a vertical slot in one side, a downwardly opening valve in the valve seat, a valve-stem projecting through the neck into the diaphragm casing and secured to the bottom of the diaphragm, a lever pivoted in the slot in the neck engaging the valve-stem, a weight on the lever outside the neck whereby the valve is held normally closed, and an uninterrupted communication between the high pressure side of the main and the diaphragm casing above the diaphragm.

In testimony whereof I have hereunto set my hand in presence of two subscribing witnesses.

JOHN E. JAMES.

Witnesses:
  W. W. BARNHART,
  H. A. JAMES.